UNITED STATES PATENT OFFICE.

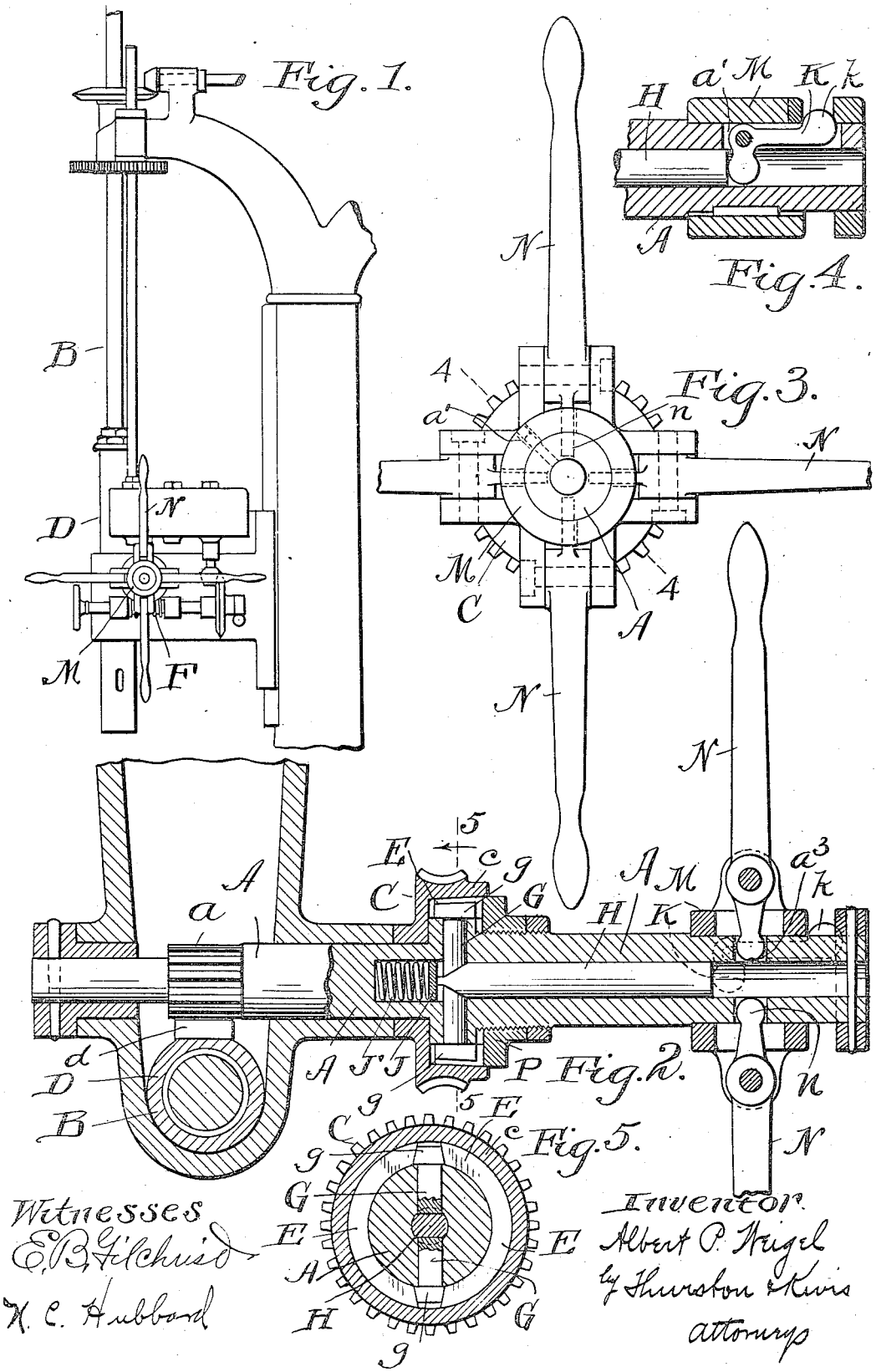

ALBERT P. WEIGEL, OF KOKOMO, INDIANA, ASSIGNOR TO KOKOMO NAIL AND BRAD COMPANY, OF KOKOMO, INDIANA, A CORPORATION OF INDIANA.

FEED MECHANISM FOR DRILL-PRESSES.

1,071,539.  Specification of Letters Patent.  Patented Aug. 26, 1913.

Application filed April 10, 1913. Serial No. 760,264.

*To all whom it may concern:*

Be it known that I, ALBERT P. WEIGEL, a citizen of the United States, residing at Kokomo, in the county of Howard and State of Indiana, have invented a certain new and useful Improvement in Feed Mechanism for Drill-Presses, of which the following is a full, clear, and exact description.

The object of the invention is to provide a drill press having power feed mechanism for the drill spindle with efficient quick return mechanism,—that is to say, mechanism with which the operator may quickly render the power feed inoperative and then operate certain parts of the feed mechanism in the direction to move the drill spindle in the reverse direction.

The invention consists in the construction and combination of parts shown in the drawing and hereinafter described and definitely pointed out in the claims.

In the drawing, Figure 1 is a side elevation of a part of a drill press which, except for the present invention, may be of any well known construction. Fig. 2 is a horizontal sectional view through the feed shaft of the drill spindle. Fig. 3 is an end view of said feed shaft. Fig. 4 is a longitudinal sectional view thereof in the plane indicated by line 4—4 on Fig. 3. Fig. 5 is a sectional view in the plane indicated by line 5—5 on Fig. 2.

A drill press in which the invention may be embodied will be of familiar construction in that the drill spindle B is rotatable, but is not movable longitudinally in a vertically movable sleeve D, which sleeve carries a rack $d$; and that a rotatable feed shaft A carries a pinion $a$ engaging the rack, whereby, through the turning of this feed shaft, the drill spindle sleeve may be moved down or up,—that is to say, in the working direction or in the return direction, as required. The power feed for turning this feed shaft includes a worm wheel C rotatably mounted upon the shaft, and clutch mechanism for connecting the worm wheel to the shaft or disconnecting it, as required. This worm wheel may be constantly engaged by a worm F which may be connected with and driven from any source of power.

In the construction shown the worm wheel C is formed with an overhanging flange $c$. Within this flange are two substantially semi-circular ring sections E, the adjacent ends of which are beveled for engagement with the wedge shaped outer ends $g$ of the driving arms G. These driving arms are diametrically opposed, and are movably mounted in radial holes in the shaft A. They are beveled at their inner ends for engagement with the wedge shaped end of the clutch operating rod H. This rod fits and is longitudinally movable in an axial hole in the shaft A. Its small end passes beyond the driving arms into engagement with a disk J, which is engaged by an expansible coil spring $J^1$ acting to move the disk and consequently rod H in the clutch releasing direction.

A bell crank lever K lies in a longitudinal slot $a^1$ in the shaft and is pivoted to said shaft. One short arm of this lever extends toward the center of the shaft and into engagement with the end of the clutch operating rod H. The other end of the lever projects through the outer surface of the shaft and has an inclined surface $k$ directed toward the operating collar M. This collar is slidably mounted upon the shaft. There is pivoted to it a lever N whose inner rounded end enters a slot $a^3$ in the shaft and engages with the ends of said slot $a^3$. When this lever occupies a position at right angles to the shaft, the collar M is in such position that it has freed the projecting end $k$ of the bell crank lever and has allowed spring $J^1$ to press the clutch operating rod H backward, and thereby has permitted the inward movement of the driving arms G and the consequent contraction of the ring sections E and the consequent disconnection of the worm wheel from shaft A. Under these conditions the operator may turn the feed shaft backward or forward by retaining his hold on the same lever he manipulated to free the clutch. When, however, the lever is moved, as to the right in Fig. 2, this will cause a corresponding movement of the collar, and this collar, during that movement, will engage with the projecting inclined end $k$ of the bell crank lever K and will so rock it that its short inwardly projecting end will force the clutch operating rod H to the left, thereby moving the driving arms G outward and causing the wedges I on their ends to expand the ring sections and force them into frictional driving contact with the worm wheel flange. The worm wheel now being connected with the shaft will turn it by its action on the ring sections and by their action on the driving arms.

It will be noted that the inner periphery of the flange of the worm wheel is slightly conical. The exterior surface of the ring sections are of like formation. A collar P which screws onto the shaft A engages the right hand face of the ring sections and may force them into the conical recess to any extent necessary to cause them to frictionally engage the worm wheel when the wedges are forced outward. The purpose of this feature of construction is to take up wear between the engaging surfaces of the ring sections and the flange of the worm wheel.

The drawing shows a plurality of arms N pivoted to the collar. The connection of each with the collar and the engagement of each with the shaft is precisely as before described. One of these levers only may be provided, or any number may be provided, according as the builder believes will be most convenient.

Having described my invention, I claim:

1. In feed mechanism for drill presses, the combination with the drill spindle feed shaft, a worm wheel rotatively mounted thereon, and a clutch for connecting said worm wheel to the shaft, of a rod which is movable in an axial hole in the feed shaft, means whereby the rod may be moved in one direction to set the clutch, said means including a bell crank lever pivoted to said shaft having one inwardly extended arm which engages said rod, and another arm provided with a beveled surface which projects beyond the outer surface of said shaft, a sleeve slidably mounted on said shaft and adapted to engage the beveled surface on said lever arm to rock the same, and an arm pivoted to said sleeve and projecting into a slot in the shaft, whereby the sleeve may be moved upon the shaft, or turned with the result of turning the shaft.

2. In feed mechanism for drill presses, the combination of the drill spindle feed shaft having an axial hole and an intersecting diametrical hole, a worm wheel which is rotatively mounted on said shaft and has a flange which overhangs said diametrical hole, and ring sections within said flange, of driving arms which are movably mounted in said diametrical hole and have beveled inner ends and wedge shaped heads which project between the proximate ends of said ring sections, a clutch operating rod movably mounted in the axial hole in said shaft, which rod passes between and beyond said driving arms and has beveled surfaces for engagement with the beveled inner ends of said driving arms, a spring in the axial hole in the driving shaft acting upon said clutch operating rod to move it in the clutch releasing direction, and means for moving said rod in the contrary direction.

3. In feed mechanism for drill presses, the combination of the drill spindle feed shaft having an axial hole and an intersecting diametrical hole, a worm wheel which is rotatively mounted on said shaft and has a flange which overhangs said diametrical hole, and ring sections within said flange, of driving arms which are movably mounted in said diametrical hole and have beveled inner ends and wedge shaped heads which project between the proximate ends of said ring sections, a clutch operating rod movably mounted in the axial hole in said shaft, which rod passes between and beyond said driving arms and has beveled surfaces for engagement with the beveled inner ends of said driving arms, a spring in the axial hole in the driving shaft acting upon said clutch operating rod to move it in the clutch releasing direction, a bell crank lever which is pivoted to the shaft and has one arm which extends into the axial hole in the shaft and engages the adjacent end of the clutch operating rod and another arm which is beveled and projects above the outer surface of said shaft, a sleeve slidably mounted on said shaft and adapted by movement in one direction to engage said beveled surface on the lever and thereby rock the lever, and means for moving said sleeve on the shaft and for preventing it from turning on the shaft.

4. In feed mechanism for drill presses, the combination with a drill spindle feed shaft, a worm wheel rotatably mounted thereon and having a flange whose inner surface is tapered, ring sections within said flange having correspondingly tapered outer surfaces, a collar which screws onto the shaft and engages said ring sections and thereby fixes the position of the ring sections within said flange, driving arms radially movable in said shaft and having on their outer ends wedge shaped heads which project between and engage the proximate ends of said ring sections, a clutch operating rod mounted within said shaft and having a tapered end for engagement with the inner ends of said driving arms whereby to move them outward, means mounted on the shaft for moving said rod endwise in one direction, and a spring for moving the same in the contrary direction.

In testimony whereof, I hereunto affix my signature in the presence of two witnesses.

ALBERT P. WEIGEL.

Witnesses:
 DON M. OSBORNE,
 RAYMOND RUDDELL.